United States Patent

Eckner et al.

Patent Number: 6,044,460
Date of Patent: Mar. 28, 2000

[54] SYSTEM AND METHOD FOR PC-RELATIVE ADDRESS GENERATION IN A MICROPROCESSOR WITH A PIPELINE ARCHITECTURE

[75] Inventors: Hartvig Eckner, Holte, Denmark; Christopher M. Giles, Lafayette, Colo.

[73] Assignee: LSI Logic Corporation, Milpitas, Calif.

[21] Appl. No.: 09/007,912

[22] Filed: Jan. 16, 1998

[51] Int. Cl.[7] .................................................. G06F 9/40
[52] U.S. Cl. ............................................................ 712/244
[58] Field of Search ................................... 712/200, 244

[56] References Cited

U.S. PATENT DOCUMENTS

| | | | |
|---|---|---|---|
| 3,614,741 | 10/1971 | McFarland et al. | 711/214 |
| 3,771,138 | 11/1973 | Celtruda et al. | 712/205 |
| 3,787,673 | 1/1974 | Watson | 708/521 |
| 3,875,391 | 4/1975 | Shapiro et al. | 708/521 |
| 4,075,704 | 2/1978 | O'Leary | 708/507 |
| 4,112,489 | 9/1978 | Wood | 712/218 |
| 4,240,139 | 12/1980 | Fukuda | 711/215 |
| 4,366,536 | 12/1982 | Kohn | 711/206 |
| 4,399,507 | 8/1983 | Cosgrove et al. | 712/219 |
| 4,819,165 | 4/1989 | Lenoski | 711/220 |
| 4,829,424 | 5/1989 | Lee | 707/4 |
| 4,990,910 | 2/1991 | Takashima et al. | 341/67 |
| 5,081,574 | 1/1992 | Larsen et al. | 712/234 |
| 5,184,229 | 2/1993 | Saito et al. | 358/427 |
| 5,226,129 | 7/1993 | Ooi et al. | 712/204 |
| 5,280,593 | 1/1994 | Bullions et al. | 712/208 |
| 5,371,711 | 12/1994 | Nakayama | 365/230.03 |
| 5,400,075 | 3/1995 | Savatier | 348/384 |
| 5,408,622 | 4/1995 | Fitch | 395/527 |
| 5,438,668 | 8/1995 | Coon et al. | 712/204 |
| 5,440,404 | 8/1995 | Okamoto | 358/432 |
| 5,463,699 | 10/1995 | Wilkinson | 382/246 |
| 5,479,527 | 12/1995 | Chen | 382/232 |
| 5,481,364 | 1/1996 | Ito | 358/261.1 |
| 5,481,693 | 1/1996 | Blomgren et al. | 712/225 |
| 5,510,785 | 4/1996 | Segawa et al. | 341/67 |
| 5,510,788 | 4/1996 | Jeong et al. | 341/106 |
| 5,539,401 | 7/1996 | Kumaki et al. | 341/67 |
| 5,550,542 | 8/1996 | Inoue | 341/67 |
| 5,568,646 | 10/1996 | Jaggar | 712/209 |

OTHER PUBLICATIONS

"Power PC 601", Motorola Inc., 1993, pp. 3.1–3.2, 3.42–3.43.

*Primary Examiner*—David Y. Eng
*Attorney, Agent, or Firm*—Conley, Rose & Tayon, PC; B. Noel Kivlin

[57] ABSTRACT

A processor is provided which performs relative addressing using the exception program counter. In one embodiment, a pipelined processor is provided with an exception program counter (EPC) register chain for tracking exception re-entry points in the instruction stream, and the instruction pipeline is provided with access to at least one of the registers in the register chain. The pipeline includes a fetch stage, a decode stage, and an execute stage. The exception PC register is identified by the decode stage as an operand in a memory access instruction for the execute stage to operate on. The execute stage then adds the contents of the exception PC register to the contents of a processor register or to a literal value to determine a target memory address.

17 Claims, 3 Drawing Sheets

SYSTEM AND METHOD FOR PC-RELATIVE ADDRESS GENERATION IN A MICROPROCESSOR WITH A PIPELINE ARCHITECTURE

BACKGROUND OF THE INVENTION

1. Field of the Invention

This invention relates to the field of processors for data-processing systems, and in particular to a method for generating PC-relative addresses in a processor having a pipe line architecture.

2. Description of the Related Art

In a data-processing system the basic logical arithmetic computational operations are performed by the processor. The processors use a processor core operating under control of program instruction words, which when decoded serve to generate control signals to control the different elements within the processor core to perform the necessary functions to achieve the processing specified in the program instruction word. For this purpose there is provided within the processor core a number of registers and logic circuits. The processor registers are used to receive, hold, and transmit information (data and instructions) used by the processor. Several different types of registers are provided within the typical processor core. For example, an accumulator register temporarily stores data and accumulates the results of logical or arithmetic operations. A program counter stores the address of the next instruction in memory to be executed. An instruction register stores the instruction code (also known as the operation code) portion of instruction which is currently being executed by the processor, and an address register or data counter stores the operand portion of the currently executing instruction.

To enable the processor to perform all of the intended arithmetic and logical operations which are desired to be performed, the processor is provided with the capability of executing a repertory of individual instructions collectively known as an instruction set. Individual instructions are executed by the processor to perform such operations as loading information into a register, transferring information between registers or between registers and memory, comparing the contents of two registers, and so forth. Such instructions may be thought of as "macro-instructions" since the execution of one such instruction by the processor typically comprises a number of sub-operations or "micro-instructions" by the circuitry making up the instruction execution control logic portion of the processor. During the execution of a single instruction many different logic gate in the instruction execution control logic circuitry may be opened and closed in a precise sequence in order to implement the particular macro-operation called for by the instruction. The opening or closing of each gate may be individually viewed as a single micro-instruction.

Processor architectures may generally be classified as either complex instruction set (computing (CISC) architectures or reduced instruction set computing (RISC) architectures. CISC architectures specify an instruction set comprising high level, relatively complex instructions (i.e. many micro-instructions for each macro-instruction). Microcoded routines stored in an on-chip read-only memory (ROM) have been suceessfully employed to provide the micro-instruction operations corresponding to a macro-instruction. More recently, hardware decoders which separate the complex instructions into simpler operations have been adopted by certain CISC microprocessor designers. The x86 microprocessor architecture is an example of a CISC architecture.

Conversely, RISC architectures specify an instruction set comprising low level, relatively simple instructions (very few, perhaps even one, micro-instructions per macro-instruction). Typically, each instruction within the instruction set is directly implemented in hardware. Complexities associated with the CISC approach are removed, allowing for more advanced implementations to be designed. Additionally, high frequency designs may be achieved more easily since the hardware employed to execute the instructions is simpler. An exemplary RISC architecture is the MIPS RISC architecture.

A commonly employed instruction in many instruction sets is the "load" instruction, in which a data value is retrieved from a specified memory location and stored in a processor register. The complement of this instruction, in which a data value is retrieved from a processor register and stored in a specified memory location, is often known as the "store" instruction. These and other instructions cause the microprocessor to initiate a memory access.

Generally, a memory access by the processor requires the provision of a target address. Three existing addressing techniques are described in the literature. The first is absolute addressing in which the target address is usually fully specified within the literal field of an instruction. The second is register offset addressing in which the literal is taken as an offset to an address contained in a register. The third is relative addressing in which the literal is taken as an offset from the current PC (program counter) address.

Absolute addressing causes one of two problems depending upon the implementation. As it is generally used, it must allow for the embedded literal field to the same size as the target address (K bits for a $2^K$ byte memory). This is very costly since more memory is required to store these bits, and a larger memory bandwidth is required to load the instructions along with a fully specified address. If absolute addresses are used with a literal field that is smaller than K bits, then absolute addressing cannot provide an addressing range independent of the PC.

Relative addressing reduces the size of the address field, and takes advantage of the fact that most addresses can be arranged to be within a small range around the value of the PC. For a J+1 bit field, the relative address range is usually from $-2^J$ to $2^J-1$. Relative addressing places additional hardware and timing requirements on the system to ensure that the offset gets added to the PC.

A technique known as pipelining is often used to enhance the speed and performance of processors. In this technique the execution of instructions is divided into stages, and the stages are overlapped so that multiple instructions may be simultaneously execued. In a pipeline structure, instructions enter at one end—are processed through the stages or pipe segments—and exit at the other end. Each of the stages of the pipeline completes a part of the instruction.

Although program execution for the most part moves through program instructions sequentially, branch instructions (herein the term "branch instructions" is taken to include unconditional branch, or "jump", instructions) provide a mechanism by which program instructions may be executed out of sequence. Hence an instruction pipeline is not necessarily working on a series of sequential instructions, and the fetch program counter register cannot necessarily be used to determine the program counter values of instructions in other stages of the pipeline.

It will be appreciated that the use of pipelining complicates the implementation of the generally desirable feature of relative addressing, since multiple instructions (each having a distinct PC) are simultaneously being executed, and the PC of the instruction being executed by the execute stage is generally unknown. It would be desirable to have an efficient implementation so that this feature may be provided without overly much additional complexity and cost.

SUMMARY OF THE INVENTION

The problems outlined above are in large part solved by a processor which performs relative addressing using the exception program counter. In one embodiment, a pipelined processor is provided with a program counter (PC) register chain for tracking exception re-entry points in the instruction stream, and the instruction pipeline is provided with access to at least one of the registers in the register chain. The pipeline includes a fetch stage, a decode stage, and an execute stage. The exception PC register is identified by the decode stage as an operand in a memory access instruction for the execute stage to operate on. The execute stage then adds the contents of the exception PC register to the contents of a processor register or to a literal value to determine a target memory address.

Broadly speaking, the present invention contemplates a pipelined processor with relative addressing, wherein the processor comprises a multistage pipeline, a program counter (PC) chain, and an exception handler. The multistage pipeline includes a fetch stage, a decode stage, and an execute stage. The fetch stage is coupled to a memory bus to retrieve a stored instruction. The decode stage is coupled to the fetch stage to receive a fetched instruction, is configured to identify operands of the fetched instruction, and is configured to provide control information for performing an operation specified by the fetched instruction. The execute stage is coupled to the decode stage to receive the control information and is configured to perform the specified operation. The program counter chain includes a fetch PC register, a decode PC register, and an execute PC register. The fetch PC register is coupled to the fetch stage to provide an address of the stored instruction. The decode PC register is coupled to the fetch PC register to receive an address of the fetched instruction. The execute PC register is coupled to the decode PC register to receive an address of a decoded instruction. The exception handler is coupled to each of the stages to receive an exception signal and is coupled to each of the registers in the program counter chain to retrieve an exception PC value corresponding to the stage which generated the exception signal. The execute stage is coupled to the decode PC register to receive the address of the decoded instruction.

The present invention further contemplates a method for performing relative addressing in a pipelined processor. The method comprises: (i) fetching a stored instruction from an address specified by a fetch PC register; (ii) latching an address of a fetched instruction in a decode PC register; (iii) identifying operands of the fetched instruction; (iv) determining control information for an operation specified by the fetched instruction; (v) copying an address of a decoded instruction into an execute PC register; (vi) providing the address of the decoded instruction as an operand; (vii) performing the specified operation in response to the control information and the operands; and (vii) retrieving an exception PC value from a selected one of the registers in response to an exception signal. The selected register corresponds to whichever one of the fetching, determining, and performing steps produces an exception.

BRIEF DESCRIPTION OF THE DRAWINGS

Objects and advantages of the invention will become apparent upon reading the following detailed description and upon reference to the accompanying drawings in which.

Figure 1:
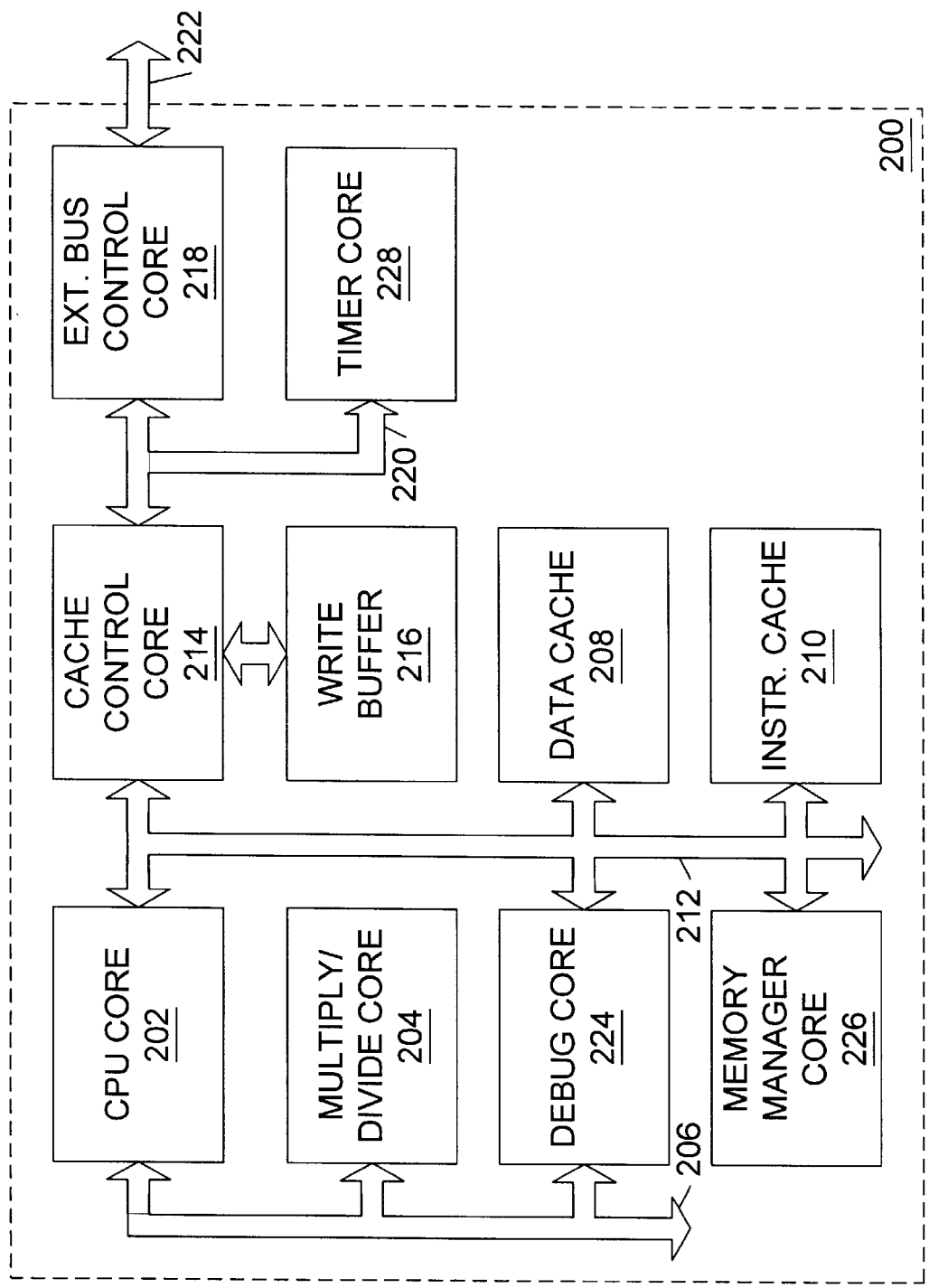
FIG. 1 is a functional block diagram of an exemplary custom integrated circuit which includes a processor core.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Custom-designed integrated circuits often involve a prohibitive amount of design effort which it is desirable to minimize. One popular method of reducing design costs is to use a set of pre-designed core modules, or "cores", which implement standard functions and which may be mixed and matched by customers to obtain a custom-designed integrated circuit with the desired functionality. A block diagram of an exemplary custom-designed circuit is shown in FIG. 1. By choosing cores from a set of predefined core modules, a system designer is able to quickly create an ASIC for nearly any desired purpose.

With reference to FIG. 1, should a designer wish to create a programmable multi-axis servo-controller ASIC 200 (for example), he could take a high-speed RISC core 202 and augment it with a multiply/divide core 204 using an extension of an internal CPU bus 206. A data cache 208 and an instruction cache 210 may be coupled to the CPU core 202 via a local CPU bus 212 to provide support for the high-speed RISC core. A cache controller 214 would then also be coupled to local CPU bus 212 and perhaps supported with a write buffer 216. An external bus control core 218 would be used to couple an on-chip system bus 220 with an off-chip system bus 222 for access to external memory chips, sensors, and control line drivers. Additional cores may be incorporated to provide other features. The debug core 224 designed to assist in system debugging may be built into the ASIC 200. Memory management features may be provided with a memory manager core 226, and space permitting, an on-chip timer core 228 may be provided. While this is but one example of the use of processor cores, it illustrates the utility and environment for which processor integrated circuits are being designed.

Figure 2:
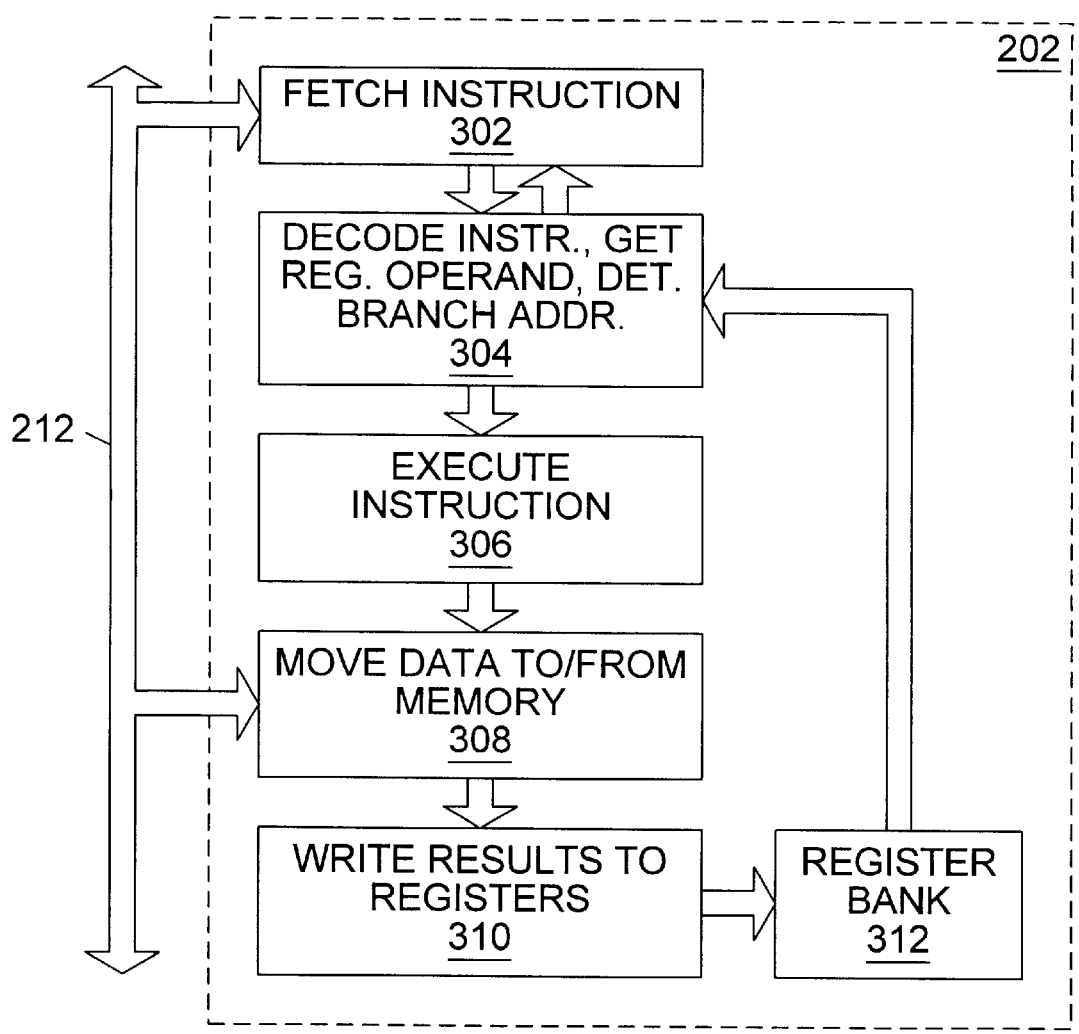
FIG. 2 is a functional block diagram of a pipelined processor core.

Turning now to FIG. 2, a pipelined processor core 202 is shown. Processor core 202 advantageously provides for relative addressing with respect to an exception program counter. In one embodiment, the processor core 202 includes fetch unit 302, a decode unit 304, an execute unit 306, a memory access unit 308, a write-back unit 310, and a register bank 312. The fetch unit 302, the decode unit 304, the execute unit 306, the memory access unit 308, and the write back unit 310 cooperate together to form an instruction execution pipeline.

Pipelining is an implementation technique whereby multiple instructions are simultaneously overlapped in execution. It provides a method for improving the efficiency and execution speed of the CPU. In a pipeline structure, instructions enter at one end—are processed through the stages or pipe segments—and exit at the other end. Each of the stages of the pipeline completes a part of the instruction.

The fetch unit 302 includes a program counter which indicates the memory address of the next instruction to be fetched. The fetch unit 302 retrieves the indicated instruction during a first pipeline cycle by accessing the local CPU bus 212. At the beginning of the next pipeline cycle, the instruction is provided to decode unit 304.

The decode unit 304 receives a fetched instruction, identifies operands of the native instruction and produces control information which indicates how to carry out an operation specified by the fetched instruction. In one embodiment, the decode unit 304 is able to identify the exception program counter (EPC) as an operand of "load" and "store" instructions that specify a relative addressing mode. Other operands which may be identified by decode unit 304 include literal values provided within the fetched instruction and register operands. Identified register operand values are retrieved from register bank 312, and the fetched instruction is converted into control signal form for use by execute unit 306. Decode unit 304 provides the control information along with the identified operands to execute unit 306. During the second pipeline cycle, decode unit 304 also determines if the fetched instruction represents a jump or a potential branch, and if so, it calculates the address of the target instruction using immediate operands of the instruction, register values, and the value of the PC, and provides the target address to the fetch instruction module 302. Decode unit 304 may detect register dependencies on results of instructions which have not yet exited the pipeline, and be accordingly configured to stall fetch unit 302 until the needed register values are provided.

During the subsequent pipeline cycle, execute module 306 carries out arithmetic and/or logical operations necessary to implement the desired operation. The results produced by execute module 306 are provided to memory access module 308 at beginning of the next pipeline cycle. One of the operations performed by the execute module may be to calculate addresses for memory accesses (i.e. a load or store operation). If the native operation does not indicate a memory access, memory access module 308 merely acts as a temporary holding register. Otherwise, memory access module 308 provides data to or retrieves data from local CPU bus 212. In the following pipeline cycle, write back module 310 takes the output from memory access module 308 and uses it to update register bank 312.

Figure 3:
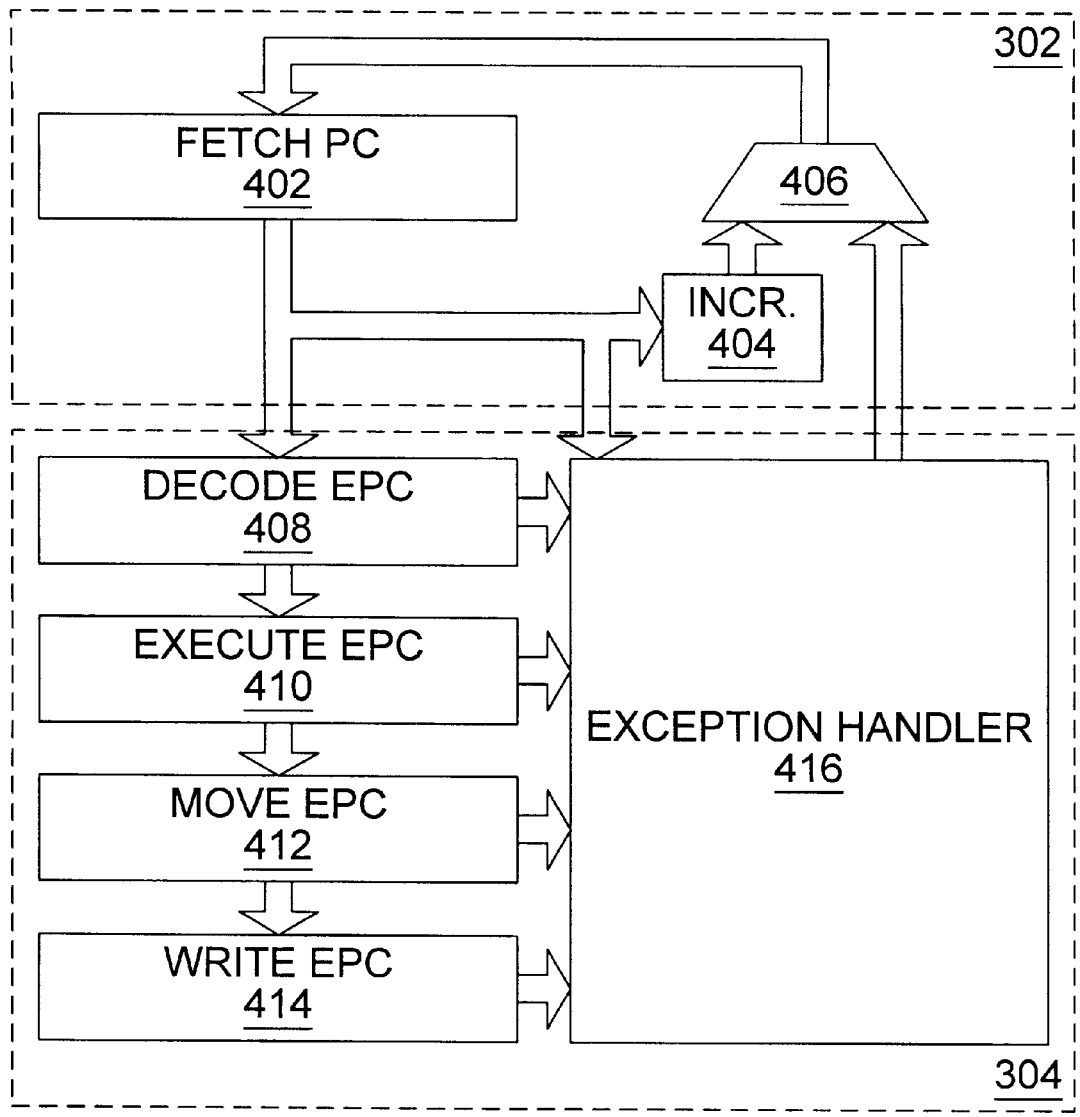
FIG. 3 is a functional block diagram of an exception program counter chain with a coupled exception handler.

Turning now to FIG. 3, additional functional blocks of CPU core 202 are shown. A fetch PC counter 402, which specifies the address of the instruction being fetched, is shown as part of fetch unit 302. The fetch PC counter 402 is provided with an incrementer 404 which generates the address of the instruction immediately following the instruction being fetched. A multiplexer 406 provides to the fetch counter 402 the address of the next instruction to be fetched. Normally this will be the address provided by incrementer 404 unless another target address is provided (i.e. a branch address or an exception address).

FIG. 3 also shows an EPC chain and an exception handler as a part of decode unit 304. A decode EPC register 408 is coupled to receive the contents of the fetch PC register 402. An execute EPC register 410 is coupled to receive the contents of the decode EPC register 408. A move EPC register 412 is coupled to receive the contents of the execute EPC register 410. A write EPC register 414 is coupled to receive the contents of the move EPC register 412. The decode EPC register 408, the execute EPC register 410, the move EPC register 412, and the write EPC register 414 are each configured to maintain an exception program counter value for the instruction being processed in the corresponding instruction pipeline stage. At the beginning of each pipeline cycle each EPC register latches the value of the previous EPC register.

At the beginning, of each pipeline cycle, the decode EPC register 408 determines the EPC value of the instruction in the decode unit 304 by either latching the address of the fetched instruction from fetch PC register 402 or by holding the previous EPC value stored in decode EPC register 408. The hold/latch signal is provided by the decode unit 304. In one embodiment, the hold signal is asserted when the decode unit 304 determines that the instruction being fetched is a branch delay slot instruction, and remains asserted at least until after the branch delay slot instruction has entered the decode unit 304.

A branch instruction cannot be executed in the fetch stage of a pipelined CPU core since time may be required to determine the target address. In order to maximize efficiency, a provision is made to allow the instruction after the branch instruction to be fetched before the branch is executed. This instruction is allowed to be processed by the pipeline and is known as a branch delay slot instruction (i.e. the instruction in the branch delay slot). In various implementations there may be more than one branch delay slot, but for each of the instructions in the branch delay slot, the exception program counter is determined to be the address of the branch instruction. This is necessary to ensure that the branch is re-executed in the event of an exception. Consequently, while the decode unit 304 is processing a branch delay slot instruction, the decode EPC register 408 holds the address of the branch instruction.

The decode unit 304 may assert the hold signal for other reasons as well. In embodiments which provide for extended length instructions (i.e. instructions which are completed by the next fetched instruction), the exception program counter is determined to be the address of the first part of the instruction (i.e. the extend instruction). Consequently, while the decode unit 304 is processing continuing parts of an extended length instruction, the decode EPC register 408 holds the address of the first part of the extended instruction.

An exception handler 416 is coupled to each of the registers in the EPC chain to determine an EPC address and to initiate the transfer of control to an exception handling routine. Exception handler 416 provides an exception routine address to fetch PC register 402 via multiplexer 406. The exception routine may be configured to determine the source of the exception and to respond accordingly. If the exception can be handled in a non-terminal manner, a transfer of control is made back to the EPC address. In one embodiment, the exception handler 416 freezes the EPC chain and the exception routine examines the contents of the EPC chain to determine the EPC address. In another embodiment, exception handler 416 determines the source of the exception signal and transfers the contents of the appropriate EPC register to a register in register bank 312. It is noted that the length of the EPC chain may be shortened (i.e. the registers corresponding to later stages in the pipeline may be removed) if they would not ever be used to generate an EPC address. For example, it may be that no exception could be caused by the writing of results to the register bank 312, and hence, the write EPC register 414 would not be needed.

In one embodiment, the decode unit 304 is coupled to decode EPC register 408 to provide the EPC value of an instruction to the execute unit 306. In another embodiment, the execute unit 306 is coupled to the execute EPC register 410 to access the EPC value of an instruction as an operand. In yet another embodiment, the memory access unit 308 may be coupled to the move EPC register 412 to access the EPC value of an instruction as an address offset or as an operand. In any of the above embodiments, it is contemplated to use the EPC register value as an addend for determining an address at which a memory access may be made. To this addend a literal value or a register value may be added as specified by the instruction. It is further contemplated to use the EPC register value as an operand for any generic operation (e.g. add, compare, multiply, etc.) by the execute unit 306 to allow for unforeseen uses of the PC value of an instruction.

In accordance with the above disclosure, a pipelined processor core has been described which implements relative addressing using the EPC value of an instruction rather than the PC value. This advantageously provides an efficient implementation of relative addressing without necessitating significant additional hardware.

Numerous variations and modifications will become apparent to those skilled in the art once the above disclosure is fully appreciated. It is intended that the following claims be interpreted to embrace all such variations and modifications.

What is claimed is:

1. A pipelined processor with relative addressing, wherein the processor comprises:
a multistage pipeline which includes:
a fetch stage coupled to a memory bus to retrieve a stored instruction;
a decode stage coupled to the fetch stage to receive a fetched instruction, wherein the decode stage is configured to identify operands of the fetched instruction and configured to provide control information for performing an operation specified by the fetched instruction;
an execute stage coupled to the decode stage to receive the control information and configured to perform the specified operation;
a program counter (PC) chain which includes:
a fetch PC register coupled to the fetch stage to provide an address of the stored instruction;
a decode PC register coupled to the fetch PC register to receive an address of the fetched instruction;
an execute PC register coupled to the decode PC register to receive an address of a decoded instruction; and
an exception handler coupled to each of the stages to receive an exception signal and coupled to each of the registers in the program counter chain to retrieve an exception PC value corresponding to the stage which generated the exception signal,
wherein the execute stage is coupled to the execute PC register to receive the address of the decoded instruction.

2. The pipelined processor of claim 1, wherein the decode stage is coupled to the decode PC register to assert a hold signal when the fetched instruction is an extend instruction, wherein the decode PC register is configured to responsively hold a current value for an additional pipeline cycle.

3. The pipelined processor of claim 1, wherein the decode stage is coupled to the decode PC register to assert a hold signal when the fetched instruction is a branch instruction, wherein the decode PC register is configured to responsively hold a current value for an additional pipeline cycle.

4. The pipelined processor of claim 3, wherein the execute stage is configured to add an operand of the decoded instruction to the address of the decoded instruction to generate a data address.

5. The pipelined processor of claim 3, wherein the exception handler is coupled to the fetch PC register to provide an error routine address in response to receiving the exception signal.

6. The pipelined processor of claim 5, wherein the exception handler is further configured to provide the exception PC value to the fetch PC register after the completion of the error routine.

7. The pipelined processor of claim 3, further comprising an incrementer coupled to the fetch PC register to receive the address of the stored instruction, wherein the incrementer is configured to provide an incremented address to the fetch PC register.

8. The pipelined processor of claim 3, wherein the decode stage asserts the exception signal upon detection of an invalid instruction.

9. The pipelined processor of claim 3, wherein the multistage pipeline further comprises a memory access stage coupled to the execute stage to receive control information and computational results, wherein the memory access stage is coupled to the memory bus to perform memory accesses as specified by the control information.

10. The pipelined processor of claim 9, wherein the multistage pipelined further comprises a write back stage coupled to the memory access stage to identify new register values, wherein the write back stage is configured to provide the new register values to a register bank.

11. The pipelined processor of claim 10, wherein the program counter chain further includes a memory PC register coupled to the execute PC register to receive an address for an executed instruction.

12. The pipelined processor of claim 11, wherein the program counter chain further includes a write back PC register coupled to the memory PC register to receive an address for a completed instruction.

13. A method for performing relative addressing in a pipelined processor, wherein the method comprises:
fetching a stored instruction from an address specified by a fetch PC register;
latching an address of a fetched instruction in a decode PC register;
identifying operands of the fetched instruction;
determining control information for an operation specified by the fetched instruction;
copying an address of a decoded instruction into an execute PC register;
providing the address of the decoded instruction as an operand;
performing the specified operation in response to the control information and the operands; and
retrieving an exception PC value from a selected one of said registers in response to an exception signal, wherein said selected register corresponds to one of said fetching, determining, and performing steps producing an exception.

14. The method of claim 13, wherein said determining control information includes asserting a hold signal to said decode PC register to cause the decode PC register to hold a current value for an additional pipeline cycle if the fetched instruction is an extend instruction.

15. The method of claim 13, wherein said determining control information includes asserting a hold signal to said decode PC register to cause the decode PC register to hold a current value for an additional pipeline cycle if the fetched instruction is a branch instruction.

16. The method of claim 15, further comprising:
providing an error routine address to the fetch PC register in response to the exception signal; and
writing the exception PC value to the register bank.

17. The method of claim 13, further comprising:
incrementing the fetch PC register after fetching the stored instruction.

* * * * *